Nov. 14, 1967 J. S. MACHADO ETAL 3,352,987
TEMPERATURE CONTROL DEVICE INCLUDING TWO SWITCHES WITH
THEIR RESPECTIVE ACTUATORS
Original Filed Sept. 11, 1964

INVENTORS
John S. Machado
Robert D. Reis
by Roberts, Cushman & Grover
Att'ys

United States Patent Office 3,352,987
Patented Nov. 14, 1967

3,352,987
TEMPERATURE CONTROL DEVICE INCLUDING TWO SWITCHES WITH THEIR RESPECTIVE ACTUATORS
John S. Machado, Woburn, and Robert D. Reis, Hingham, Mass., assignors to United Electric Controls Company, Watertown, Mass., a corporation of Massachusetts
Continuation of application Ser. No. 395,789, Sept. 11, 1964. This application Aug. 25, 1966, Ser. No. 575,496
2 Claims. (Cl. 200—140)

ABSTRACT OF THE DISCLOSURE

A temperature control switch in which there are two switches with switch pins and two switch actuators supported for relative movement on the one hand to turn on and on the other hand to turn off a heating element as the heating element cools down and heats up respectively, the switch actuators being adjustable so that one contacts its switch before the other to turn off the heating element, but if it fails the other switch will turn off the heating element.

---

This application is a continuation of application Ser. No. 395,789, filed Sept. 11, 1964, now abandoned.

As herein illustrated, the device has for its specific purpose to maintain the temperature of medical blankets at predetermined temperatures with very little fluctuation; to provide a control which enables selecting the temperature at which the blanket is to be maintained and changing it at will; to provide a device which enables a visual indication of the temperature at any given time; to provide a device with primary means normally operative to maintain the selected temperature and secondary means operative in the event of failure of the primary means to maintain the temperature; to provide a device which is portable for ease in transportation about a hospital or other place of use and which can be mounted in a position to be easily observed for constant checking; to provide a device which is useful for controlling the temperature of a fluid or electrically heated blanket; to provide a device which is equally useful in controlling the temperature of other body coverings, such as bed blankets, sheets, space suits and the like which not only require constant checking of temperature but also the precautionary measures of secondary control in the event of failure; and to provide a device which is relatively simple, reliable, accurate and durable.

As herein illustrated, the device comprises a pair of switches having switch pins, a switch pin actuating part, means supporting the switches and part for movement relative to each other to effect actuation of the pin of one of the switches earlier than that of the other, and to effect actuation of the other one of the switches only if the first switch fails, a temperature-responsive device operably associated with the part operative to move the part toward the switches, a graduated scale having an indicator movable therealong, and means movable by the part, responsive to the temperature-responsive device, to effect movement of the indicator along the scale. The switches and part are pivotally supported for movement relative to each other and a pair of adjustable screws are screwed into the plate opposite the switch pin. The temperature-responsive device has contact with a part between its pivoted end and the adjustable screws. The means movable by the part to effect movement of the indicator is a pin yieldably engaged with the distal end of the part and urging the latter in a direction to move the part away from the switches. The pin is fixed to a gear, a spring opposes rotation of the gear, and a second gear meshing therewith and fixed to a spindle on which the indicator is mounted affords the means for transmitting motion between the part and the indicator.

Figure 1:
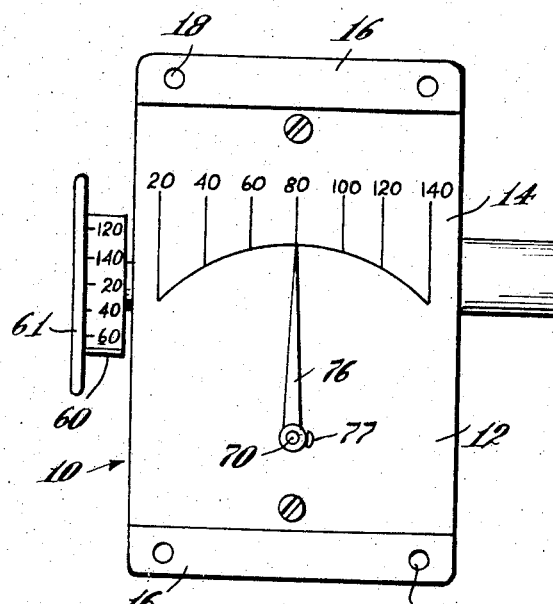
Figure 2:
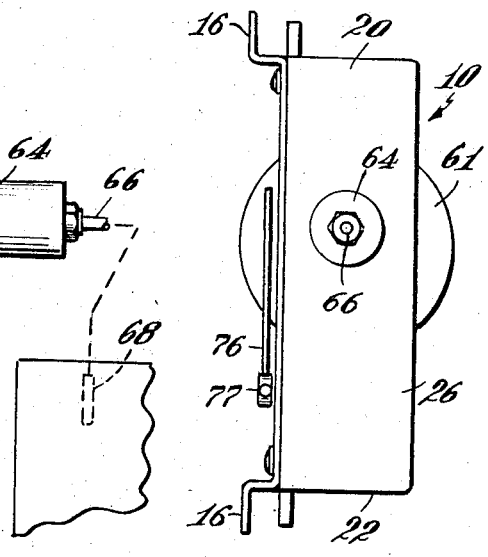
Figure 3:
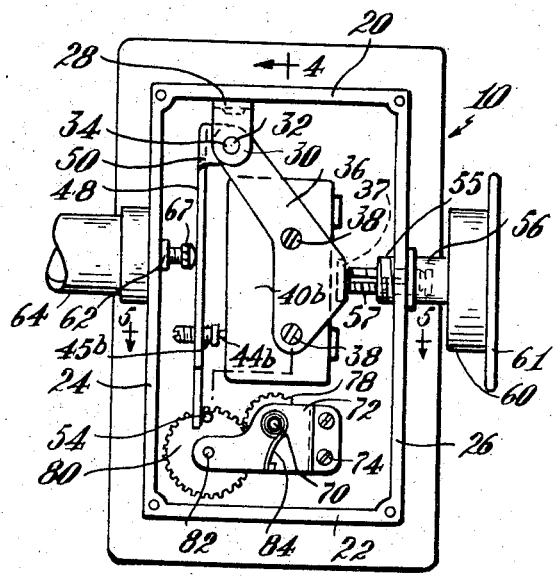
Figure 4:
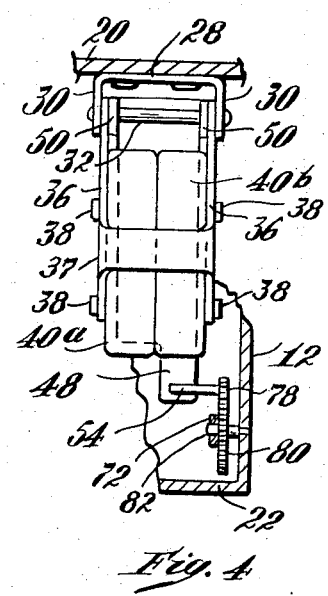
Figure 5:
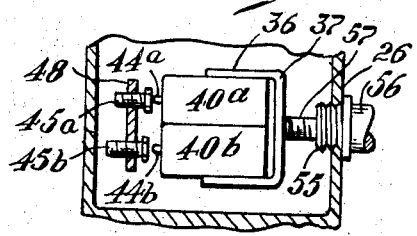

The invention will now be described in greater detail with reference to the accompanying drawings wherein:

FIG. 1 is a front elevation of the control diagrammatically connected to a blanket;
FIG. 2 is a side elevation of the control;
FIG. 3 is a rear elevation of the control;
FIG. 4 is a section taken on the line 4—4 of FIG. 3; and
FIG. 5 is a section taken in a horizontal plane containing the axes of the switch pins.

Referring to the drawings, the control is supported within a housing 10 comprising a front wall 12 on which there is a graduated scale 14 and at the upper and lower ends of which are mounting flanges 16 containing bolt holes 18, from the rear side of which projects four walls 20, 22, 24 and 26 providing at the rear side a rectangular housing for containing the operating parts. At the junction of the respective walls there are threaded openings for receiving screw bolts by means of which a back plate may be secured to the walls to enclose the operative parts. A U-shaped bracket member 28, having spaced parallel arms 30, is secured to the inner side of the wall 20, as shown in FIGS. 3 and 4, with its arms 30—30 extending downwardly therefrom. The lower ends of the arms 30—30 contain holes 32 for receiving a pin 34. A bracket 29 comprising pair of arms 36, joined transversely by a bar 37, is pivotally supported on the pin 34, the arms being provided at their lower ends with spaced parallel openings for receiving bolts 38, by means of which a pair of switches 40a, 40b are secured side-by-side between the arms for pivotal movement relative to the axis of the pin 32. The switches have switch-actuating pins 44a, 44b which project toward the left, as seen in FIG. 3, in spaced parallel relation. Preferably the switches are of the snap-actuation type in which pressure applied to the switch-actuating pins either opens or closes the contacts and holds them in position until they are released whereupon they close or open as the case may be.

A switch pin actuating plate 48 having at one end spaced parallel ears 50 containing holes for receiving the pin 32 is pivotally mounted on the pin 32 so as to extend downwardly therefrom substantially parallel to the left-hand sides of the switches with a portion opposite the switch pins and with a portion extending beyond the switches into engagement with a pin 54, the purpose of which will be described hereinafter. This plate 48 contains opposite the switch pins 44a, 44b adjustable screws 45a, 45b for contact therewith.

At the right-hand side of the support the wall 26 contains a threaded opening into which is threaded a bearing 55 and a shaft 56 having a threaded portion 57 of reduced diameter is rotatably mounted in the bearing with the portion of reduced diameter extending therethrough into engagement with the bar 37 joining the arms 36. A peripherally graduated hub 60 is fixed to the outer end of the shaft and a knurled plate 61 is fastened to the outer face of the hub. By rotating the shaft 56 the position of the switches 40a, 40b may be adjusted relative to the plate 48. The graduations on the hub represent temperature in degrees Fahrenheit. The opposite wall 24 of the support contains an opening through which there extends a rod 62 having at its inner end an adjustable screw 67 for engagement with the plate 48 between the pivoted end of the latter and the adjustable screws 44a, 44b. The rod protrudes from a cylinder 64 fastened to the outer side of the wall 24 which contains an expandable element (not shown), for example a bellows-type motor expandable by an increase in temperature to move the rod outwardly and by a decrease in temperature to retract the rod inwardly. A capillary tube 66 is connected to the bellows and is provided at the end of a suitable length of the tube with a sensing device 68 in the form of a bulb for holding a volatile fluid. As herein shown, the sensing device is placed within the article to be heated, to wit, the blanket, for the purpose of carefully controlling the temperature of the blanket while in use.

As constructed, expansion of the volatile fluid will, in turn, expand the bellows, project the rod 62 toward the plate 48 and hence move the plate 48 toward the switches 40a, 40b so as to actuate the switch pins. By adjusting the position of the screws 45a, 45b in the plate 48 so that one extends further forward from the plate than the other relative to the switches, the switch opposite the pin projecting furthest forward will be actuated first and its actuation caused to lower or raise the temperature according to the dictates of the sensing device. The other switch is only actuated in the event that the first switch fails to operate and serves as a safety device to insure maintaining a constant temperature in spite of possible malfunctioning of the primary switch.

In order to visually indicate the temperature at all times independently of the scale setting on the hub, an indicator is provided, the scale 14 of which, as heretofore mentioned, is mounted on the front wall 12 as shown in FIG. 1. A spindle 70 is rotatably supported perpendicular to the front wall in a bearing bracket 72 fastened to the inner side of the wall 12 by screws 74 with a portion extending through the front wall upon which is mounted a pointer 76, the proximal end of which is secured to the spindle by a set screw 77 and the distal end of which terminates adjacent the scale. A gear 78 is fixed to the spindle 70 inside the support in mesh with a larger gear 80 mounted on a stub shaft 82 fixed to the bearing bracket 72 in a position such that its peripheral edge is close to the distal end of the plate 48. The gear 80 provides support for the pin 54 referred to above which engages the distal end of the plate 48. A spring 84 is coiled about the stub shaft 70 and secured to the bearing bracket under tension so as to rotate the smaller gear in a clockwise direction and hence the larger gear in a counterclockwise direction (FIG. 3) to hold the plate 48 away from the switches 40a, 40b and also to hold the pointer 76 at a fixed position along the scale. Displacement of the plate 48 by change in temperature will of course effect rotation of the gear 80 and through the meshing gear 78 rotation of the spindle 70 and hence the pointer 76 along the scale 14. As thus constructed, the control may be preset for a predetermined temperature in accordance with the use thereof by rotation of the hub 60 so as to move the switches 40a, 40b toward or away from the plate 48, the position for a particular condition of temperature being selectable by placing a graduation on the hub opposite an index mark (not shown) on the wall 26 of the housing. When a temperature has been selected for operation, extension of the rod 62 of the expandable motor, corresponding to the predetermined temperature selected, will be required to bring the plate 48 and the adjusting screws 45a, 45b supported thereby into a position to actuate the valve-actuating pins. As herein illustrated, the scale on the front of the instrument is marked in degrees Fahrenheit with lower and upper limits of 20 and 140 and the hub is correspondingly graduated to low and high temperatures of 20 to 140 degrees Fahrenheit. When the hub is rotated to set the graduation 20 opposite the index on the wall, the switches 40a, 40b will be so located with reference to the plate supporting the adjustable screws 44a, 44b, that when 20° F. is reached, the switch 45a will make contact with the switch-actuating pin 44a. The other screw 45b will be adjusted so that it will not touch the pin 44b unless the switch 40a fails. Since the screws 45a, 45b can be adjusted very closely, close control of the temperature can be had while at the same time providing for safety in the event that the primary switch 40a fails. The temperature of operation is constantly visible by the position of the pointer on the scale 14.

Although the device shown is used in conjunction with temperature control, it could also be employed to control pressure or a combination of temperature and pressure.

It should be understood that the present disclosure is for the purposes of illustration only and that this invention includes all modifications and equivalents which fall within the scope of the appended claims.

We claim:
1. A control comprising a support, a bracket pivotally mounted on the support for angular movement about a predetermined axis, a pair of switches secured to the bracket side-by-side, said switches embodying switch-actuating pins facing in the same direction, a rigid actuator plate mounted on the support in confronting relation to said switch-actuating pins for angular movement about said predetermined axis, a pair of screws adjustably mounted on said rigid actuator plate with one screw opposite each of the actuator pins, an adjustable part mounted on the support in engagement with the bracket operable to move the bracket about its pivot relative to said rigid actuator plate, a device containing an expandable fluid, said device embodying an actuator part engaged with said rigid actuator plate which is movable by expansion of the fluid in said device to move said rigid actuator plate toward said switches, said screws being adjustable on said rigid actuator plate so that an end of one projects beyond the end of the other, a scale on the support, a spindle mounted on the support with its axis at right angles to the plane of the scale, an indicator fixed to the spindle parallel to the surface of the scale for angular movement about the axis of the spindle along the scale, a first gear fixed to said spindle, a second gear in mesh with said first gear, a pin fixed to said second gear in a position to engage the distal end of said rigid actuator plate, said rigid actuator plate being displaceable in response to the temperature-responsive device to effect rotation of said second gear and hence movement of said indicator, and a spring coiled about said spindle, said spring biasing the spindle in a direction to hold said rigid plate engaged with said actuator plate away from the switches.

2. A control according to claim 1, wherein the switches are supported with their switch-actuating pins at equal distances from said predetermined axis.

References Cited

UNITED STATES PATENTS

| 2,136,235 | 11/1938 | Crago | 236—11 |
| 2,748,225 | 5/1956 | Kautz | 200—140 |
| 2,779,838 | 1/1957 | Reis | 200—153 X |
| 3,050,600 | 8/1962 | Booth et al. | 200—153 |
| 3,182,149 | 5/1965 | Noakes | 200—83 X |
| 3,235,692 | 2/1966 | Kucera | 200—83 X |

FOREIGN PATENTS 1,253,229  6/1962  France.

BERNARD A. GILHEANY, *Primary Examiner.*

H. A. LEWITTER, *Assistant Examiner.*